June 26, 1951     W. K. SKOLFIELD     2,558,589
MOUNTING FOR FAN BLADES
Filed Nov. 17, 1948
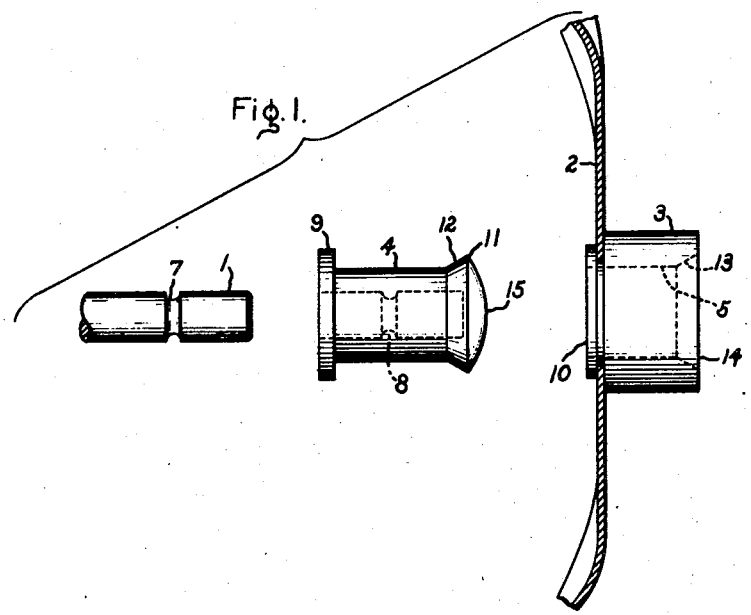
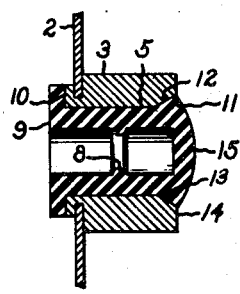
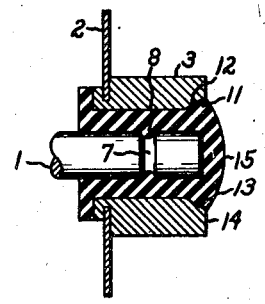
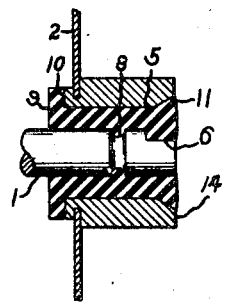
Inventor:
William K. Skolfield,
by *Sheridan Lee Biggs*
His Attorney.

Patented June 26, 1951

2,558,589

UNITED STATES PATENT OFFICE 2,558,589

MOUNTING FOR FAN BLADES

William K. Skolfield, Bridgeport, Conn., assignor to General Electric Company, a corporation of New York Application November 17, 1948, Serial No. 60,491

4 Claims. (Cl. 64—11)

My invention relates to rotating fans and particularly to the connection between a fan and the shaft which rotates the fan.

In the manufacture of fans, particularly those of the types known as desk fans and home fans, it has been customary in the past to mount the fan blades on a hub and to provide means for removably securing the fan hub to a driving shaft which turns the fan. My invention is an improvement in the removable connection between such a fan hub and its driving shaft.

One object of my invention is to simplify the connection between fan hub and driving shaft. Another object is to embody in such connection a vibration-damping construction to lessen the noise of operation of the fan. A still further object is to provide a connection which will allow self-alignment of the fan blade on the driving shaft when the fan is in operation.

When a set-screw or similar clamp is used between the hub of a fan and the driving shaft to hold the fan on the shaft, the screw or clamp acts as a miniature pump, collecting and throwing off oil which may creep along the drive shaft from its bearings. This is objectionable because the flying oil forms streaks on the fan blades, and in some cases is thrown out of the fan onto walls, ceiling, clothes, etc. In order to prevent this, my invention eliminates set screws or their equivalents in the joint between fan and drive shaft.

All of these objects are obtained by an inexpensive construction having a minimum number of parts of simple design, which are easily fabricated and readily assembled without special tools. The fan hub is provided with a resilient inner sleeve or bushing which in turn is slipped over the drive shaft, the sleeve being compressed between the hub and the shaft and frictionally holding the parts together. Interlocking formations between the sleeve and parts of the shaft and hub resiliently resist longitudinal separation along the axis of rotation.

Other objects and the details of that which I believe to be novel and my invention will be clear from the following description and claims taken with the accompanying drawing in which are illustrated examples of fan blade mountings embodying the present invention and incorporating the resilient sleeve.

In the drawings, Fig. 1 is an expanded fragmentary side view of parts of a fan according to a preferred form of my invention; Fig. 2 is a side sectional view showing the first stage of assembly of parts of Fig. 1; Fig. 3 shows the final stage of assembly of the parts of Fig. 1, and Fig. 4 is a view similar to Fig. 3 but showing a modification of my invention.

It should be understood that a complete fan usually includes such elements as a supporting base, a motor carried by the base, a drive shaft from the motor, bearings for the drive shaft, a fan hub, and the fan blades themselves. None of these conventional parts excepting a portion of the drive shaft, the hub, and portions of the fan blades are shown in the drawing.

A free end of the drive shaft is indicated at 1. This is normally a cylindrical shaft of rigid material such as metal. The fan blade or blades 2 are secured in any suitable fashion to the hollow central hub 3, which is also made of metal, plastic or equivalent comparatively rigid material.

In order to secure the fan blades and hub removably to the driving shaft I provide a cylindrical tubular sleeve or bushing 4, made of flexible, resilient, compressible rubber or similar material such as one of the synthetic rubbers.

The proper dimensioning and shaping of these parts, each with respect to the others, is of importance in the success of my invention. As previously stated, the resilient sleeve is compressed between the hub and the shaft, and therefore the relative sizes of the bore of the hub and the outside of the sleeve, as well as the size of the inside of the sleeve and the outside of the drive shaft, should be noted.

The fan hub has a bore 5 through its center, and the diameter of this bore is made equal to or slightly smaller than the outside diameter of the rubber sleeve, when the sleeve is in an unstressed state. In assembly, the sleeve is pushed through the hub (Fig. 2) and then the shaft is pressed into the sleeve (Fig. 3). If the diameter of the hub bore and outside of the sleeve are made equal to each other, then the diameter of the shaft is made slightly greater than the inside diameter of the sleeve in order to secure compression of the sleeve between hub and shaft. If the hub bore is made slightly smaller than the outside sleeve diameter, then the inside sleeve diameter and the shaft diameter may be equal, and still obtain the required compression.

Because of the inherent compression of the sleeve between hub and shaft when assembled, the friction between the parts has been found to be sufficient in many cases to hold the hub on the shaft for transmission of rotary torque from the shaft to the hub. However, where rotary slippage between the shaft and the sleeve is encountered, a more positive torque connection may be obtained by flattening or making non-circular a portion of the shaft, as shown at 6 in Fig. 4. Naturally, in this case the inside of the sleeve is shaped to follow the contour of the shaft. Also, it is obvious that a similar formation of the bore of the hub and the outside of the sleeve could be made to overcome rotational slipping here, if necessary.

The flexible and resilient nature of the sleeve permits the fan blades to align themselves radially to the drive shaft when the fan is being rotated by the shaft. This prevents the establishment of vibration otherwise resulting from accidental eccentricity of balance of the fan blades. The resiliency of the sleeve also prevents the mutual transmission and amplification of vibration between the fan motor and the fan proper, there being no direct or rigid connection between the metallic hub and the metallic shaft. Noise is thereby held to a minimum.

Further refinement of the parts of the assembly is made to improve the appearance of the joint and to prevent unintentional longitudinal movement of the fan hub with respect to the drive shaft. When the drive shaft is in a non-horizontal position there may be a tendency for the hub to creep along the shaft during sustained operation of the fan in spite of the compression and friction of the resilient sleeve. To prevent this, I provide interlocking formations such as an annular groove 7 near the end of the drive shaft and an annular ridge or bead 8 of similar size and shape in the resilient sleeve. This ridge fits snugly in the groove when the parts are properly assembled as shown in the drawing and, because it extends normal to the axis of the sleeve and shaft, it prevents accidental longitudinal movement of the sleeve with respect to the shaft in either direction along the axis of rotation. Of course, the flexible nature of the material of the sleeve permits the insertion or withdrawal of the drive shaft if considerable force is applied, but such degree of force is not encountered in normal operation of the fan.

To prevent unintended longitudinal movement of the fan hub with respect to the sleeve I provide other interlocking formations such as an outwardly extending annular flange 9 on the sleeve, shown as circumferentially extending from the end of the sleeve in a plane normal to the axis of the sleeve and abutting an end face 10 on the hub. The other end of the sleeve is also provided with an annular flange 11, shown in this instance as having a tapered inner face 12 which seats in a countersunk portion 13 in the opposite end face 14 of the fan hub. Engagement of the hub faces with the flanges 9 and 11 effectively and resiliently prevents accidental longitudinal movement of the hub in either direction with respect to the sleeve after assembly. This is so because the axial length of the bushing between the end flanges is substantially equal to the axial length of the bore of the hub. However, the flexibility of the material of the sleeve permits the flange 11 to be forced through the bore during assembly, before the drive shaft is inserted in the sleeve.

The tapered formation of face 12 of the flange 11 facilitates the collapse of this flange so that the sleeve can be inserted through the bore of the hub during assembly. After the sleeve is in place, the resiliency of the sleeve material will expand the flange until it fills the countersunk portion 13. The cooperating countersink and tapered face then help to hide the joint between the sleeve and hub and improve the appearance of the assembly.

It will be noted that in the form of Fig. 1 through 3 the outer end of the sleeve is closed by a wall or web 15. This end wall is provided not only for appearance but also for its function of supporting the flange 11 against collapse or compression. In the form of Fig. 4, using an open-ended sleeve, collapse of the flange 11 is prevented after assembly because the end of the drive shaft is extended beneath the flange to provide a support. In all forms, the flange 9 on the other end of the sleeve is supported against collapse by the body of the drive shaft, although this is not of so much importance because this flange need not be made of a size or shape to pass readily through the hub bore during assembly.

It will be seen from the above that I have furnished a joint which requires the addition of but a single simple part to connect the drive shaft and fan hub. This part contains in itself features which simplify manufacture and assembly and which improve performance of the fan. No set screws are required, and costly cementing, vulcanizing, or similar joining processes are avoided. Assembly of the parts requires no tools or special equipment. After assembly the parts are held together by friction and compression of the sleeve or bushing, and resiliently interlocked.

As will be evident from the foregoing description, certain aspects of my invention are not limited to the particular details of construction of the examples illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

1. In a motor driven fan, a rotatable cylindrical metallic drive shaft having an annular groove formed in its surface near one end thereof, a fan blade, and means for mounting said fan blade on said drive shaft comprising a metallic hub for said fan blade, a resilient tubular bushing inserted and compressed between said metallic hub and drive shaft, an annular bead in said bushing corresponding to and seated within said groove in the shaft, an outwardly extending annular flange on one end of said bushing, a wall closing the other end of said bushing, an outwardly extending annular flange supported by said end wall, and outer faces on said hub engaged by said annular flanges.

2. A resilient driving bushing for attaching a rigid hub to a rigid shaft and for transmitting torque from the shaft to the hub, the shaft including an annular groove at the point of attachment, said bushing comprising a cylindrical tubular body of resilient material having sufficient thickness to be compressed when assembled between the shaft and hub, an outwardly extending, resilient, tapered annular flange on one end of said body, a web closing said one end of the body, said web bowing axially outwardly, an annular flange on the opposite end of said body, the axial length of the body between said flanges being substantially equal to the axial length of the hub, and an annular internal rib on said body intermediate the ends, whereby said one end may be forced through the hub and the shaft may be forced into said body with said rib engaging the groove in said shaft.

3. A resilient driving bushing adapted to be the sole means for attaching a rigid hub to a rigid shaft and for transmitting torque from the shaft to the hub, said bushing comprising a cylindrical tubular body of resilient material having sufficient thickness to be compressed when assembled between the shaft and hub, an outwardly extending resilient, tapered annular flange on one end of said body, a web closing said one end of the body, an annular flange on the opposite end of said body, the axial length of the body between said flanges being substantially equal to the axial length of the hub, whereby said one end may be forced through the hub and the shaft may be forced into said body.

4. A resilient driving bushing adapted to be the sole means for attaching a rigid hub to a rigid shaft and for transmitting torque from the shaft to the hub, the shaft including an annular groove at the point of attachment, said bushing comprising a cylindrical tubular body of resilient material having sufficient thickness to be compressed when assembled between the shaft and the hub, an outwardly extending, resilient annular flange integral with one end of said body, an annular flange integral with the opposite end of said body, the axial length of the body between said flanges being substantially equal to the axial length of the hub, and an annular internal rib integral with the inside of said tubular body intermediate the ends thereof, whereby said one end of the bushing having the resilient flange may be forced through the hub and the shaft may then be forced into said tubular body with said internal rib engaging the groove in said shaft.

WILLIAM K. SKOLFIELD.

REFERENCES CITED

The following references are of record in the file of this patent:

UNITED STATES PATENTS

| Number | Name | Date |
|---|---|---|
| 2,097,318 | Dowell | Oct. 26, 1937 |
| 2,164,485 | Yantis | July 4, 1939 |
| 2,212,072 | Newnham | Aug. 20, 1940 |

FOREIGN PATENTS

| Number | Country | Date |
|---|---|---|
| 583,260 | Germany | of 1933 |